J. A. FLEMING.
SCALE BEAM AND POISE.
APPLICATION FILED MAY 8, 1908.
920,942.
Patented May 11, 1909.
2 SHEETS—SHEET 1.
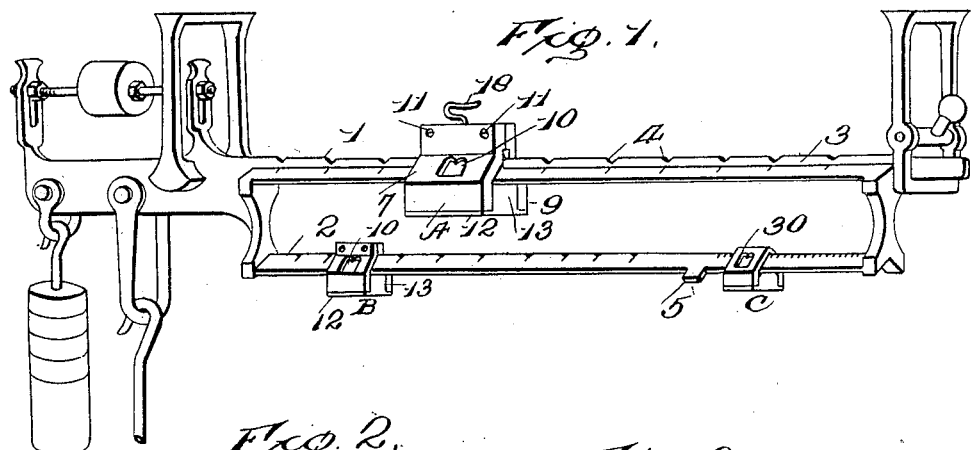
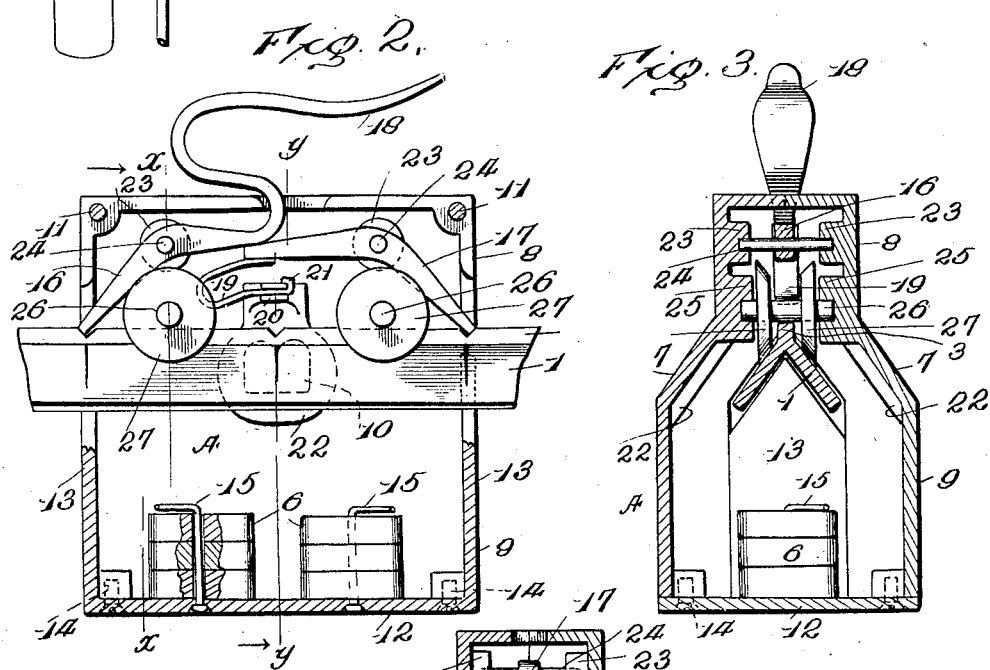
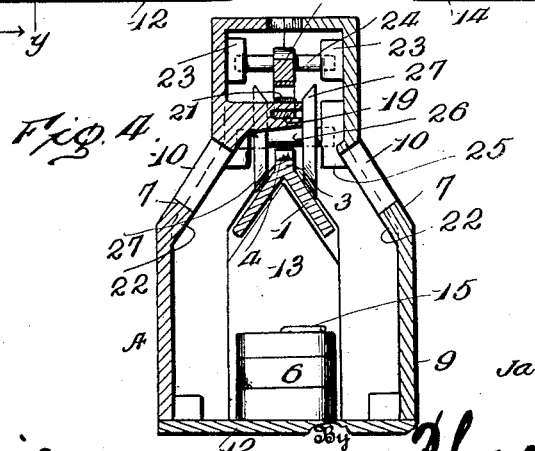
Witnesses
Inventor
James A. Fleming
By
Attorneys

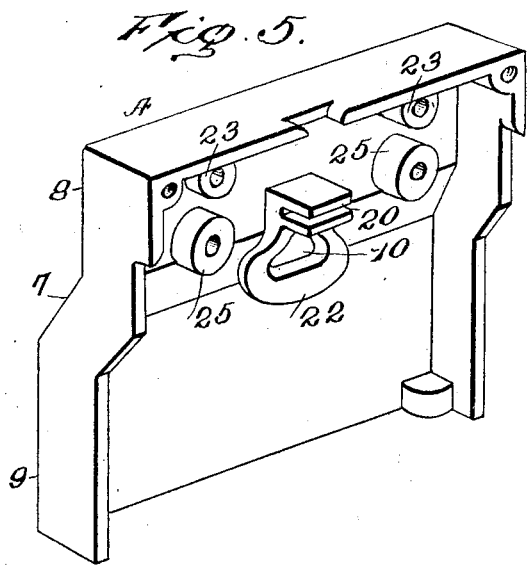
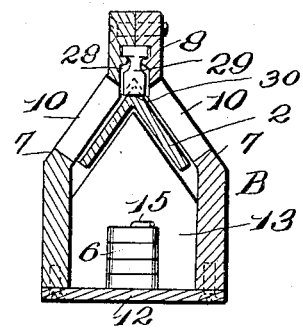
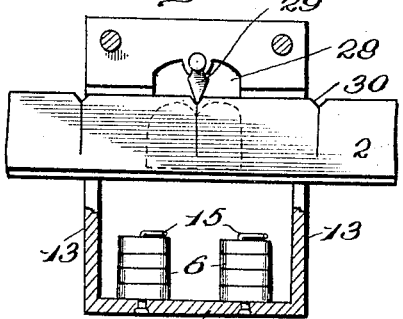
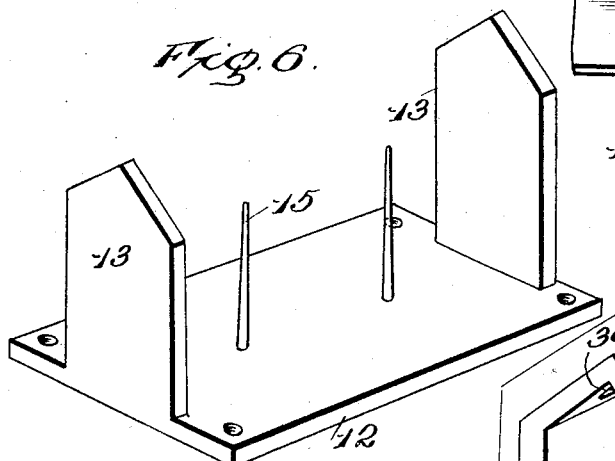
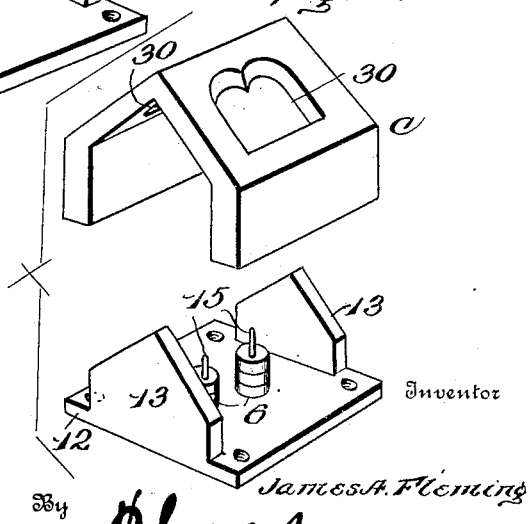

UNITED STATES PATENT OFFICE.

JAMES A. FLEMING, OF DANVILLE, ILLINOIS.

SCALE BEAM AND POISE.

No. 920,942.　　　　Specification of Letters Patent.　　　　Patented May 11, 1909.

Application filed May 8, 1908. Serial No. 431,668.

*To all whom it may concern:*

Be it known that I, JAMES A. FLEMING, citizen of the United States, residing at Danville, in the county of Vermilion and State of Illinois, have invented certain new and useful Improvements in Scale Beams and Poises, of which the following is a specification.

This invention provides a novel form of compound scale beam and poise, the purpose being to devise a form of beam which will enable the graduations to be easily read and to supply a poise which may be easily moved upon the beam and locked thereto when moved to the requried position so as to prevent possible displacement.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a scale beam and coöperating poises embodying the invention. Fig. 2 is a view of one-half of the thousands poise, the base being in section and the parts in position. Fig. 3 is a transverse section on the line $x$—$x$ of Fig. 2, looking in the direction of the arrows. Fig. 4 is a cross section on the line $y$—$y$ of Fig. 2, looking to the right, as designated by the arrows. Fig. 5 is a perspective view of one-half of the thousands poise. Fig. 6 is a perspective view of the base portion thereof. Fig. 7 is a longitudinal section of the hundreds poise. Fig. 8 is a transverse section of the hundreds poise. Fig. 9 is a perspective view of the units poise, the parts being separated.

Corresponding and like parts are referred to in the following description and indicated in all the views of the drawings by the same reference characters.

The scale beam is of the variety comprising two members or bars 1 and 2 which are spaced apart and connected at or near their ends, each member receiving a poise or poises and suitably graduated to indicate weights. The scale beam as a whole is mounted in the ordinary manner common in platform scales, and since such mountings are well understood and form no part of the present invention, it is not deemed necessary to enter into a detail description thereof.

The members or bars 1 and 2 of the scale beam are of V-form in cross section, the hollow side facing downward and the angle or crest extending upward. The member or bar 1 is formed with a vertical flange 3, which is provided at intervals with notches 4 corresponding to the scale graduations so as to properly fix the position of the poise A mounted thereon. The lower member or bar 2 is provided in its length with a stop 5, the end portion to the right of said stop being graduated into units ranging from one hundred pounds downward, whereas the portion to the left of the stop 5 is graduated to designate hundreds. The poise B mounted upon the left end portion of the member or bar 2 is of less mass than the poise A, so as to indicate hundreds. The poise C mounted upon the right hand portion of the member or bar 2 is of less mass than the poise B so as to designate pounds and fractional parts thereof up to one hundred. When the poises A and B are moved to the left hand end of the members or bars 1 and 2 to the zero mark, the poise C may be used for weighing pounds and fractional parts thereof up to one hundred. The poise B weighs one hundred pounds only, whereas the poise A indicates thousands.

The thousands poise A consists of similar parts or sections, as indicated most clearly in Fig. $5_1$ and a base, as shown most clearly in Fig. 6. The lower portion of the poise is widened and is adapted to receive weights 6, and the upper portion is contracted and receives the means whereby the weight may be moved easily upon the scale beam and locked in the desired adjusted position. Each section or part of the poise has an off-set 7 intermediate of its upper part 8 and the lower part 9 in different vertical planes, the off-set portion 7 coming opposite to a wing of the member or bar 1 and having an opening 10 to admit of the scale graduations being read. Each section or part is provided with inner flanges at its upper and vertical edges so as to form a space when the parts are placed together to receive the weights 6 and the lock and antifriction devices. Fastenings 11 connect the sections together at their upper ends. The base portion of the poise consists of a plate 12 and uprights 13, the plate 12 closing the bottom of the poise and receiving the weight 6 and the uprights 13 coming between the lower portion of the inner vertical flanges of the said sections or parts of the poise so as to close the space through which the member or bar 1 passes. Fastenings 14 secure the base to the side sections or parts. Pins 15 extended upward from the plate 12 pass through openings formed in the weight 6 to retain the latter in place, the upper ends of the pins being bent to extend over the weights and prevent movement thereof. Dogs or catches 16 and 17 are arranged near opposite ends of the poise and are adapted to engage with the notches 4 of the flange 3 to hold the poise in the required adjusted position. The inner upper ends of the dogs or catches overlap and one of said dogs or catches has its end extended to form a finger piece 18 which passes through an opening in the top of the poise and is bent into an approximately S-form, so that the upper portion of the finger piece extends about horizontal to be pressed upon when it is required to effect disengagement of the dog or catches from the member 1 preliminary to moving the poise A upon the scale beam. A spring 19 exerts an upward pressure upon the overlapped ends of the dogs or catches so as to hold their lower ends in positive engagement with the notches 4. The spring 19 is approximately of U-form and has a horizontal arrangement, one member being fitted between spaced lugs 20 extended inward from the sections or parts of the poise. One end, as 21, of the spring is bent into a hook to engage around the ends of a set of lugs so as to hold the spring in place. The lugs 20 form part of a reinforcement 22 which surrounds the opening 10 upon the inner side of the off-set portion 7 so as to strengthen this part of the poise. Apertured bosses 23 project inward from the upper portions 8 of the poise and receive trunnions or pins 24 of the dogs or catches. Other apertured bosses 25 project inward from the upper portions 8 of the poise and receive journals 26 or pairs of wheels 27 arranged to travel upon the oppositely inclined wings of the member or bar 1, thereby relieving friction when moving the poise. The wheels 27 are beveled to correspond to the slope or inclination of the wings forming parts of the member or bar 1.

The poise B is substantially of like form to the poise A, consisting of side sections or parts and a base, the latter being similar in construction to the base of the poise A and comprising a plate 12 and uprights 13. The side sections or parts of the poise 1 are substantially the same as the left parts of the poise A with the exception of the inner flanges, the opposite portions 7 having openings 10 and the upper portions 8 being provided with slots 28 leading upward from the openings 10 to receive a steel bit 29 whose lower edge has opposite sides beveled to a chisel edge so as to enter notches 30 in the crest of the member or bar 2 to hold the poise B in an adjusted position. The base of this poise is also provided with pins 15 for retaining the weights 6 in position, the parts of the poise when assembled being secured in substantially the same manner as like parts of the poise A. The poise C comprises a base portion similar in formation to the base portion of the poises A and B, and an upper portion consisting of similar side sections or parts of integral formation, having openings 30 in the sloping parts to admit of the scale graduations at the right of the member or bar 2 being read. This poise is adapted to be moved upon the member or bar 2 by pressure upon either end thereof according to the direction of movement desired.

For determining the weight less than one hundred pounds, the poise C is used and moved upon the right hand portion of the lower member or bar 2. Even hundred pounds are indicated on the left hand portion of the member or bar 2 by means of the poise B. Thousands pounds are designated by the poise A upon the upper member or bar 1. The poises A and B are adapted to be secured by interlocking means between them and the respective members or bars of the beam, such interlocking means also insuring a correct positioning of the poises. No confusion can possibly arise from reading the scale graduations, since one number only appears through the side openings of the poises, and since the wings of the scale beam members are provided with like graduations and the poises have openings in opposite sides, the readings may be made from either side of the scale beam, as may be most convenient.

Having thus described the invention, what is claimed as new is:

1. A scale beam of V-form in cross section and arranged with the hollow side facing downward, and a poise mounted upon the scale beam and having parts straddling the same, and a base portion connecting the separate side portions of the poise and provided with uprights to close the space between the side portions below the scale beam.

2. A poise for a scale beam comprising transversely spaced portions to pass upon opposite sides of the beam and project below the same, a base consisting of a plate secured to the lower spaced portions of the poise, and uprights at the ends of the plate to close the space between the lower portion of the poise below the beam, weights placed upon the said plate, and pins extended upward from said plate and passed through openings of the weights to retain the latter in place.

3. In combination with a notched scale beam, a poise slidably mounted thereon, oppositely disposed dogs pivoted to the poise and having their inner ends overlapped and their outer ends adapted to enter notches of the scale beam and secure the poise in an adjusted position, and means for applying pressure to the inner end of one of said dogs to effect simultaneous movement of both.

4. In combination, a notched scale beam, a poise slidable thereon, oppositely disposed dogs pivoted to the poise and having their inner ends overlapped, one of said dogs having its inner end extended to form a finger piece, and a spring for exerting a pressure upon the dogs to hold them in engagement with the scale beam.

In testimony whereof I affix my signature in presence of two witnesses.

JAMES A. FLEMING. [L. S.]

Witnesses:
CHARLES E. WEBSTER,
H. L. DWIGGINS.